US007610307B2

(12) United States Patent
Havewala et al.

(10) Patent No.: US 7,610,307 B2
(45) Date of Patent: Oct. 27, 2009

(54) METHOD AND SYSTEM OF DETECTING FILE SYSTEM NAMESPACE CHANGES AND RESTORING CONSISTENCY

(75) Inventors: Sarosh Cyrus Havewala, Redmond, WA (US); Ravinder S. Thind, Kirkland, WA (US); Neal R. Christiansen, Bellevue, WA (US); Ran Kalach, Bellevue, WA (US); James R. Benton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 302 days.

(21) Appl. No.: 11/000,180

(22) Filed: Nov. 30, 2004

(65) Prior Publication Data

US 2006/0117056 A1    Jun. 1, 2006

(51) Int. Cl.
*G06F 17/00* (2006.01)
*G06F 7/00* (2006.01)

(52) U.S. Cl. .................... 707/104.1; 707/102; 707/200
(58) Field of Classification Search ................ 707/102, 707/200, 104.1
See application file for complete search history.

(56) References Cited

U.S. PATENT DOCUMENTS

| | | | | | |
|---|---|---|---|---|---|
| 5,761,678 | A | * | 6/1998 | Bendert et al. | 707/204 |
| 5,832,501 | A | * | 11/1998 | Kain et al. | 707/103 R |
| 6,119,118 | A | * | 9/2000 | Kain et al. | 707/10 |
| 6,216,211 | B1 | * | 4/2001 | McBrearty et al. | 711/162 |
| 6,389,427 | B1 | * | 5/2002 | Faulkner | 707/104.1 |
| 6,408,298 | B1 | | 6/2002 | Van | |
| 6,473,806 | B1 | | 10/2002 | Snyder | |
| 6,513,051 | B1 | * | 1/2003 | Bolosky et al. | 707/204 |
| 6,578,035 | B1 | * | 6/2003 | Barker | 707/10 |
| 6,625,604 | B2 | * | 9/2003 | Muntz et al. | 707/9 |
| 6,687,701 | B2 | | 2/2004 | Karamanolis | |
| 6,708,186 | B1 | | 3/2004 | Claborn | |
| 6,772,161 | B2 | * | 8/2004 | Mahalingam et al. | 707/10 |
| 6,775,672 | B2 | * | 8/2004 | Mahalingam et al. | 707/10 |
| 6,775,673 | B2 | * | 8/2004 | Mahalingam et al. | 707/10 |
| 6,920,461 | B2 | | 7/2005 | Hejlsberg | |
| 6,976,060 | B2 | * | 12/2005 | Manczak et al. | 709/219 |
| 7,043,485 | B2 | * | 5/2006 | Manley et al. | 707/100 |

(Continued)

FOREIGN PATENT DOCUMENTS

EP    0856803    8/1998

(Continued)

OTHER PUBLICATIONS

Ghemawat, Sanjay, et al., "The Google File System", SOSP '03, Bolton Landing, NY, Oct. 19-22, 2003, pp. 29-43.*

(Continued)

*Primary Examiner*—Robert Stevens
(74) *Attorney, Agent, or Firm*—Workman Nydegger (57) ABSTRACT

Method and system for maintaining namespace consistency between selected objects maintained by a file system and a filter associated therewith. Metadata regarding selected objects of a file system is maintained by a filter while the filter is attached to the file system and persisted in non-volatile storage. The namespace of the file system may be changed while the filter is unattached from the file system. Afterwards, when the filter is attached to the file system, the namespace of the filter is synchronized with the namespace of the file system for the selected objects.

33 Claims, 7 Drawing Sheets

U.S. PATENT DOCUMENTS

| | | | |
|---|---|---|---|
| 7,120,631 B1* | 10/2006 | Vahalia et al. | 707/8 |
| 7,146,524 B2* | 12/2006 | Patel et al. | 714/6 |
| 7,150,018 B2* | 12/2006 | Golds et al. | 718/102 |
| 7,240,114 B2* | 7/2007 | Karamanolis et al. | 709/225 |
| 7,284,150 B2* | 10/2007 | Ma et al. | 714/6 |
| 2001/0020245 A1* | 9/2001 | Golds et al. | 709/102 |
| 2002/0128995 A1* | 9/2002 | Muntz et al. | 707/1 |
| 2002/0161855 A1* | 10/2002 | Manczak et al. | 709/219 |
| 2003/0033308 A1* | 2/2003 | Patel et al. | 707/10 |
| 2003/0115434 A1* | 6/2003 | Mahalingam et al. | 711/165 |
| 2003/0115438 A1* | 6/2003 | Mahalingam et al. | 712/1 |
| 2003/0115439 A1* | 6/2003 | Mahalingam et al. | 712/1 |
| 2003/0131020 A1* | 7/2003 | Karamanolis et al. | 707/200 |
| 2003/0131104 A1* | 7/2003 | Karamanolis et al. | 707/10 |
| 2003/0135514 A1* | 7/2003 | Patel et al. | 707/102 |
| 2004/0111390 A1* | 6/2004 | Saito et al. | 707/1 |
| 2004/0111441 A1* | 6/2004 | Saito et al. | 707/200 |
| 2004/0133570 A1* | 7/2004 | Soltis | 707/3 |
| 2004/0153479 A1* | 8/2004 | Mikesell et al. | 707/200 |
| 2004/0172421 A1* | 9/2004 | Saito et al. | 707/200 |
| 2004/0225719 A1* | 11/2004 | Kisley et al. | 709/212 |
| 2005/0076031 A1* | 4/2005 | Xu et al. | 707/9 |
| 2005/0246397 A1* | 11/2005 | Edwards et al. | 707/204 |
| 2005/0246401 A1* | 11/2005 | Edwards et al. | 707/205 |
| 2005/0251522 A1* | 11/2005 | Clark | 707/100 |
| 2006/0026161 A1* | 2/2006 | Henseler | 707/10 |
| 2006/0075294 A1* | 4/2006 | Ma et al. | 714/13 |

FOREIGN PATENT DOCUMENTS

| | | |
|---|---|---|
| EP | 1376405 | 6/2003 |
| WO | 0177908 | 10/2001 |

OTHER PUBLICATIONS

Brandt, Scott A., et al., "Efficient Metadata management in Large Distributed Storage Systems", MSS '03, Apr. 7-10, 2003, pp. 290-298.*

Zhang, Zheng, et al., "Designing a Robust Namespace for Distributed File Services", Proceedings of the 20th IEEE Symposium on Reliable Distributed Systems (2001), New Orleans, LA, Oct. 28-31, 2001, pp. 162-171.*

Chen, Yong, et al., "CoStore: A Storage Cluster Architecture Using Network Attached Storage Devices", ICPADS '02, Dec. 17-20, 2002, pp. 301-306.*

Karamanolis, C., et al., "An Architecture for Scalable and Manageable File Services", Hewlett-Packard Labs Technical Report HPL-2001-173, Palo Alto, CA, © 2001, pp. i and 1-14 (downloaded from: web.archive.org/web/20040503083445/http://www.hpl.hp.com/techreports/2001/HPL-2001-173.pdf).*

Menon, Jai, et al., "IBM Storage Tank—A Heterogeneous Scalable SAN File System", IBM Systems Journal, vol. 42, No. 2, © 2003, pp. 250-267.*

Moreton, Tim D., et al., "Storage, Mutability and Naming in Pasta", Lecture Notes in Computer Science, vol. 2376/2002, © 2002, pp. 215-219.*

"volume definition", SearchStorage.com, May 23, 2001, pp. 1-2 (downloaded from: searchstorage.techtarget.com/sDefinition/0,,sid5_gci214464,00.html).*

"volume definition", PCMag.com encyclopedia, © 1981-2007, 1 page (downloaded from: www.pcmag.com/encyclopedia_term/0,2542,t=volume&i=54097,00.asp).*

Bolosky, William J., et al., "Single Instance Storage in Windows> 2000", 4th USENIX Windows Systems Symposium, Seattle, WA, Aug. 3-4, @000, pp. 1-12.*

Aranya, Akshat, et al., "Tracefs: File System to Trace Them All", FAST 2004, San Francisco, CA, Mar. 31-Apr. 2, 2004, pp. 1-25.*

Anderson, Darrell, et al., "Failure-Atomic File Access in the Slice Interposed Network Storage System", Cluster Computing, vol. 5, No. 4, Oct. 2002, pp. 411-419.*

Xu, Zhichen, et al., "Towards a Semantic-Aware File Store", Proc. of the HotOS IX: The 9th Workshop on Hot Topics in Operating Systems, Lihue, HI, May 18-21, 2003, pp. i and 181-186.*

Underwood, William, et al., "Study of the Use of the Presidential Electronic Records PilOt System (PERPOS): Final Report", PERPOS Technical Report ITTL/CISTD 02-4, Georgia Institute of Technology, Atlanta, GE, Dec. 2002, pp. i-iii and 1-20.*

Tang, Hong, et al., "An Efficient Data Location Protocol for Self-Organizing Storage Clusters", SC '03, Phoenix, AZ, Nov. 15-21, 2003, pp. 1-13.*

Kistler, James J., et al., "Disconnected Operation in the Coda File System", ACM Transactions on Computer Systems, vol. 10, Issue 1, Feb. 1992, pp. 3-25.*

Office Action dated Jun. 20, 2007 cited in related U.S. Appl. No. 11/000,430.

Office Action dated Dec. 11, 2007 cited in related U.S. Appl. No. 11/000,430.

Office Action dated Apr. 2, 2008 cited in related U.S. Appl. No. 11/000,430.

* cited by examiner

METHOD AND SYSTEM OF DETECTING FILE SYSTEM NAMESPACE CHANGES AND RESTORING CONSISTENCY

FIELD OF THE INVENTION

The invention relates generally to computers, and more particularly to file systems.

BACKGROUND

With contemporary operating systems, such as Microsoft Corporation's Windows® XP operating system with an underlying file system such as the Windows® NTFS (Windows® NT File System), FAT, CDFS, SMB redirector file system, or WebDav file systems, one or more file system filter drivers may be inserted between the I/O manager that receives user I/O requests and the file system driver. In general, filter drivers (sometimes referred to herein simply as "filters") are processes or components that enhance the underlying file system by performing various file-related computing tasks that users desire, including tasks such as passing file system I/O (requests and data) through anti-virus software, file system quota providers, file replicators, and encryption/compression products.

For example, antivirus products provide a filter that watches I/O to and from certain file types (.exe, .doc, and the like) looking for virus signatures, while file replication products perform file system-level mirroring. Other types of file system filter drivers are directed to system restoration (which backs up system files when changes are about to be made so that the user can return to the original state), disk quota enforcement, backup of open files, undeletion of deleted files, encryption of files, and so forth. Thus, by installing file system filter drivers, computer users can select the file system features they want and need, in a manner that enables upgrades, replacement, insertion, and removal of the components without changing the actual operating system or file system driver code.

A file system filter may maintain internal metadata for files and directories on a volume. Changes to a volume that a filter is associated with may cause the internal metadata of the filter to be out of sync with the state of the volume. This may cause the filter to behave incorrectly or render it unable to perform its desired function.

What is needed is a method and system for maintaining consistency between the namespaces of selected objects maintained by a file system and a filter associated therewith.

SUMMARY

Briefly, the present invention provides a method and system for maintaining namespace consistency between selected objects maintained by a file system and a filter associated therewith. Metadata regarding selected objects of a file system is maintained by a filter while the filter is attached to the file system and persisted in non-volatile storage. The namespace of the file system may be changed while the filter is unattached from the file system. Afterwards, when the filter is attached to the file system, the namespace of the filter is synchronized with the namespace of the file system for the selected objects.

In one aspect of the invention, the metadata is maintained in a file that is stored on the file system. Upon attaching the filter to the file system, the filter determines if the file system has been restored from a dataset. If so, the filter updates file system identifiers included in the metadata to match the file system identifiers for the objects that still exist in the file system. Information in the metadata corresponding to files that no longer exist in the file system is deleted.

In another aspect of the invention, the metadata includes records that are associated with the selected objects. Each record includes a file system identifier and the object name of an object of the file system. Upon attaching the filter to the file system, the filter attempts to open each object by the file system identifier stored in the object record. If the attempt succeeds, the filter then obtains the name of the object and updates the name of the object in the object record if the name has changed. If the attempt fails, the filter attempts to open the object via the object name stored in the record. If this attempt succeeds, the filter updates the file system identifier in the record. Otherwise, the filter deletes the record. In this manner the filter synchronizes the namespace of the filter with the file system namespace.

Other aspects will become apparent from the following detailed description when taken in conjunction with the drawings, in which:

DETAILED DESCRIPTION

Exemplary Operating Environment

Figure 1:
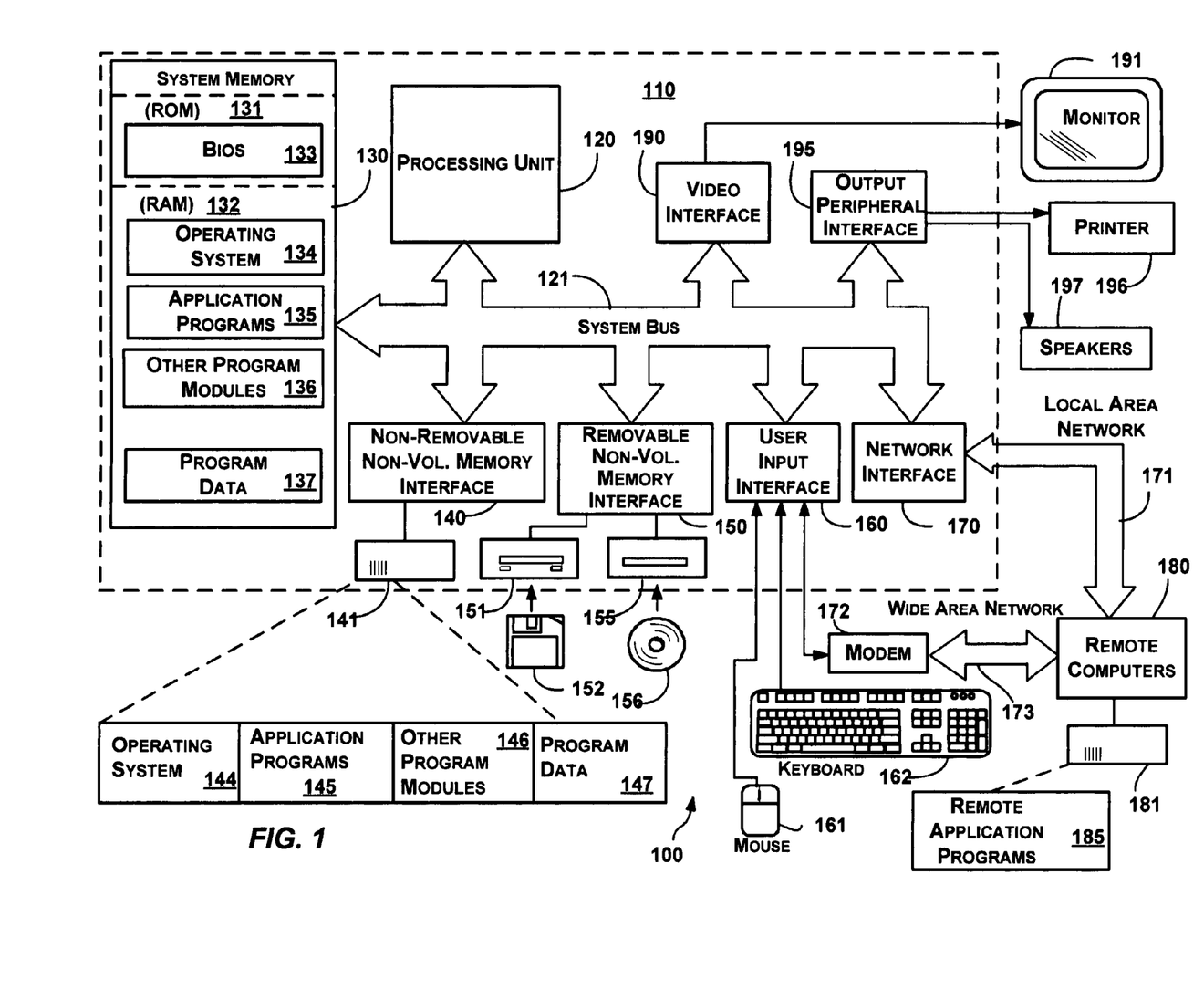
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Filters and Arrangements Thereof

Figure 2:
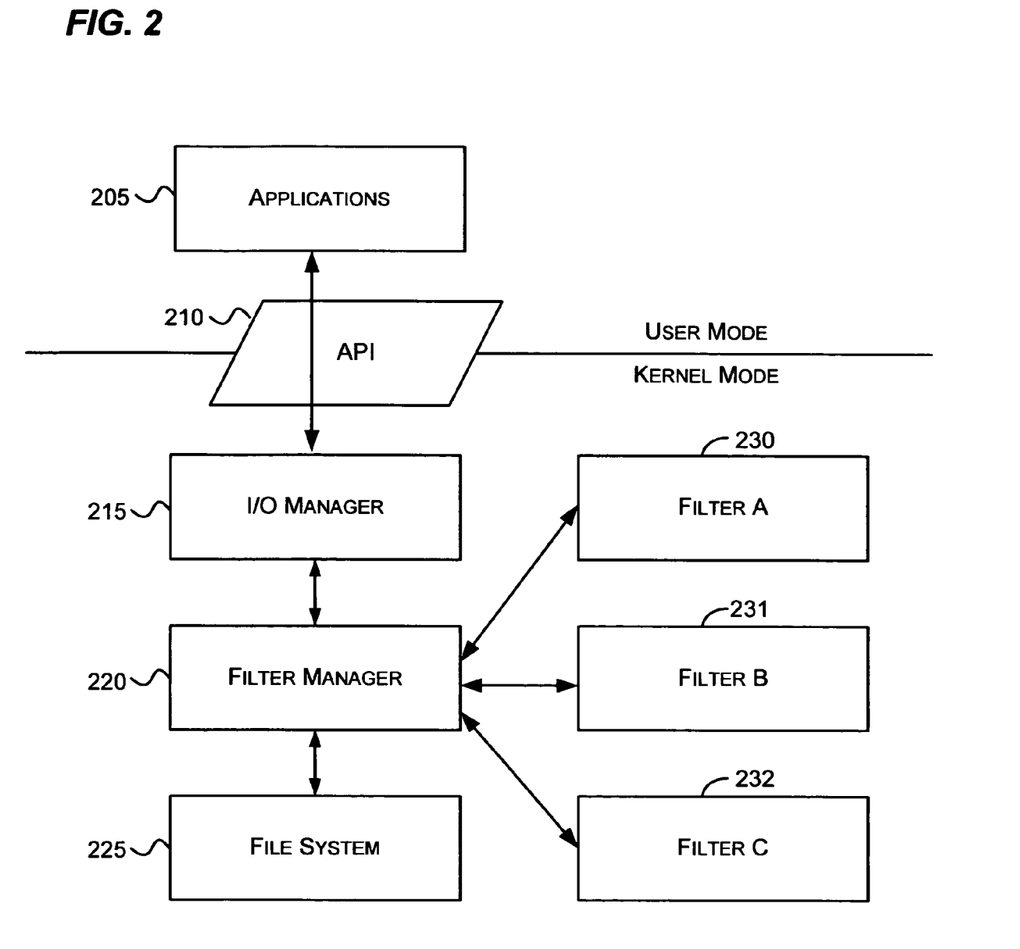
FIG. 2 is a block diagram representing an exemplary arrangement of components of a system in which the present invention may operate in accordance with various aspects of the invention.

FIG. 2 is a block diagram representing an exemplary arrangement of components of a system in which the present invention may operate in accordance with various aspects of the invention. The components include one or more applications 205, an applications programming interface (API) 210, an input/output (I/O) manager 215, a filter manger 220, a file system 225, and one or more filters 230-232.

The applications 205 may make file system requests (e.g., via function/method calls) through the API 210 to the I/O manager 215. The I/O manager 215 may determine what I/O request or requests should be issued to fulfill each request and send each I/O request to the filter manager 220. The I/O manager 210 may also return data to the applications 205 as operations associated with the file system requests proceed, complete, or abort.

In one implementation, filters comprise objects or the like that when instantiated register (e.g., during their initialization procedure) with a registration mechanism in the filter manager 220. For efficiency; each filter typically will only register for file system requests in which it may be interested in processing. To this end, as part of registration, each filter notifies the filter manager 220 of the types of I/O requests in which it is interested (e.g., create, read, write, close, rename, and so forth). For example, an encryption filter may register for read and write I/Os, but not for others wherein data does not need to be encrypted or decrypted. Similarly, a quota filter may be interested only in object creates and object writes.

In addition to specifying the types of I/O requests in which it is interested, a filter may further specify whether the filter should be notified for pre-callbacks and post callbacks for each of the types of I/O. A pre-callback is called as data associated with an I/O request propagates from the I/O manager 215 towards the file system 225, while a post-callback is called during the completion of the I/O request as data associated with the I/O request propagates from the file system 225 towards the I/O manager 215.

From each I/O request, the filter manager 220 may create a data structure in a uniform format suitable for use by the filters 230-232. Hereinafter, this data structure is sometimes referred to as callback data. The filter manager 220 may then call and pass the callback data to each filter that has registered to receive callbacks for the type of I/O received by the filter manager 220. Any filters registered to receive callbacks for the type of I/Os received by the filter manager are sometimes referred to as registered filters.

Typically, the filter manager 220 passes callback data associated with a particular type of I/O request to each registered filter sequentially in an order in which the registered filters are ordered. For example, if the filters 230 and 232 are registered to receive callbacks for all read I/O requests and are ordered such that the filter 230 is before the filter 232 in processing such requests, then after receiving a read I/O, the filter manager 220 may first call and pass the callback data to the filter 230 and after the filter 230 has processed the callback data, the filter manager 220 may then call and pass the callback data (as modified, if at all) to the filter 232.

A filter may be attached to one or more volumes. That is, a filter may be registered to be called and receive callback data for I/Os related to only one or more than one volumes.

A filter may generate its own I/O request which may then be passed to other filters. For example, an anti-virus filter may wish to read a file before it is opened. A filter may stop an I/O request from propagating further and may instruct the filter manager to report a status code (e.g., success or failure) for the I/O request. A filter may store data in memory and persist (e.g., store) this data on disk. In general, a filter may be created to perform any set of actions that may be performed by a kernel-mode or user-mode process and may be reactive (e.g., wait until it receives I/O requests before acting) and/or proactive (e.g., initiate its own I/O requests or perform other actions asynchronously with I/O requests handled by the I/O manager 215).

Figure 3:
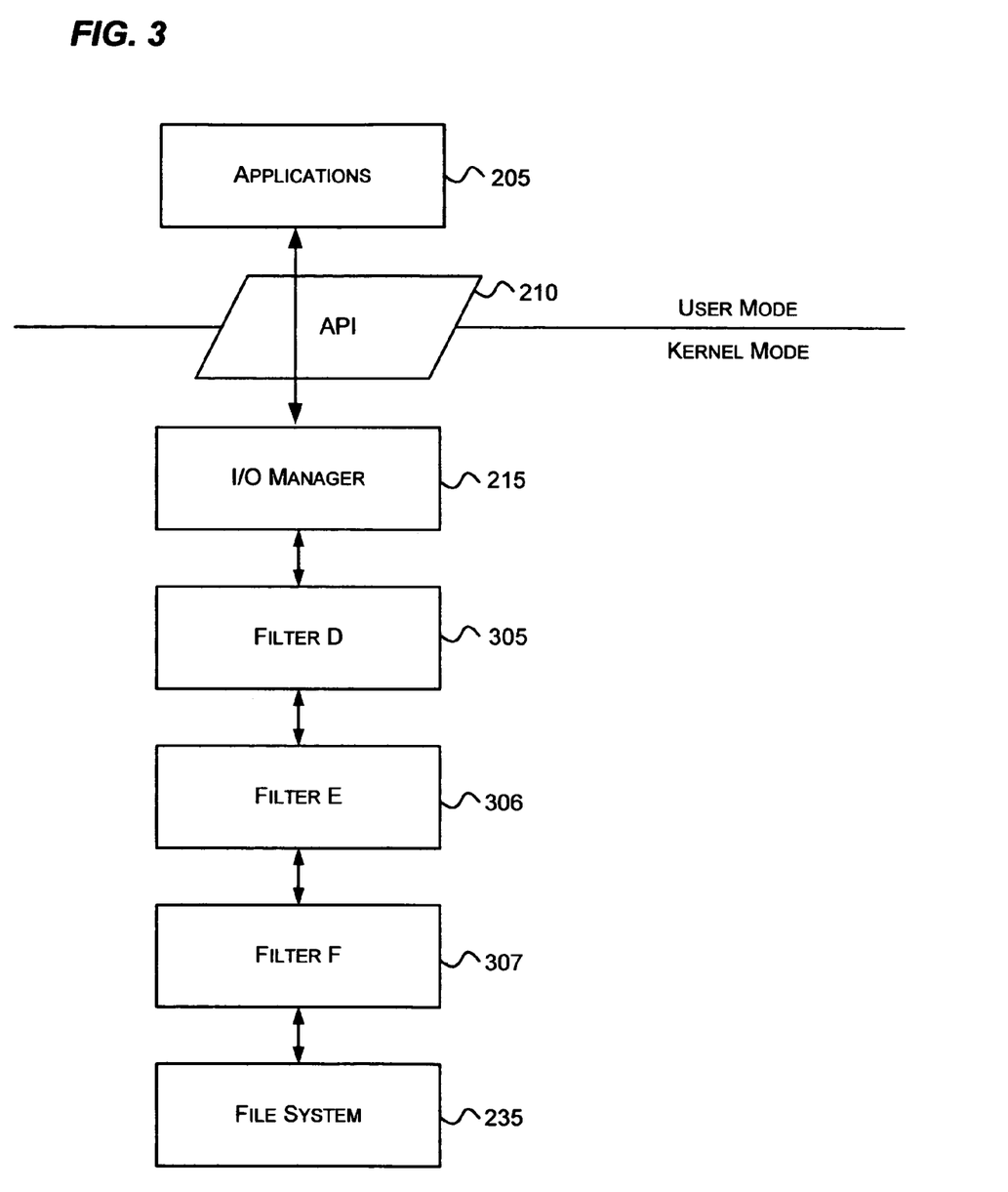
FIG. 3 is a block diagram representing another exemplary arrangement of components of a system in which the present invention may operate in accordance with various aspects of the invention.

In one embodiment, filters may be arranged in a stacked manner as illustrated in FIG. 3, which is a block diagram representing another exemplary arrangement of components of a system in which the present invention may operate in accordance with various aspects of the invention. In this embodiment, each of the filters 305-307 may process I/O requests and pass the requests (modified or unmodified) to another filter or other component in the stack. For example, in response to a read request received from one of the applications 205, the I/O manager 215 may issue an I/O request and send this request to the filter 305. The filter 305 may examine the I/O request and determine that the filter 305 is not interested in the I/O request and then pass the I/O request unchanged to the filter 306. The filter 306 may determine that the filter 306 will perform some action based on the I/O request and may then pass the I/O request (changed or unchanged) to the filter 307. The filter 307 may determine that the filter 307 is not interested in the I/O request and pass the I/O request to the file system 235.

After the file system 235 services the I/O request, it passes the results to the filter 307. Typically, the results pass in an order reverse from that in which the I/O request proceeded (e.g., first to filter 307, then to filter 306, and then to filter 305). Each of the filters 305-307 may examine the results, determine whether the filter is interested in the results, and may perform actions based thereon before passing the results (changed or unchanged) on to another filter or component.

Figure 4:
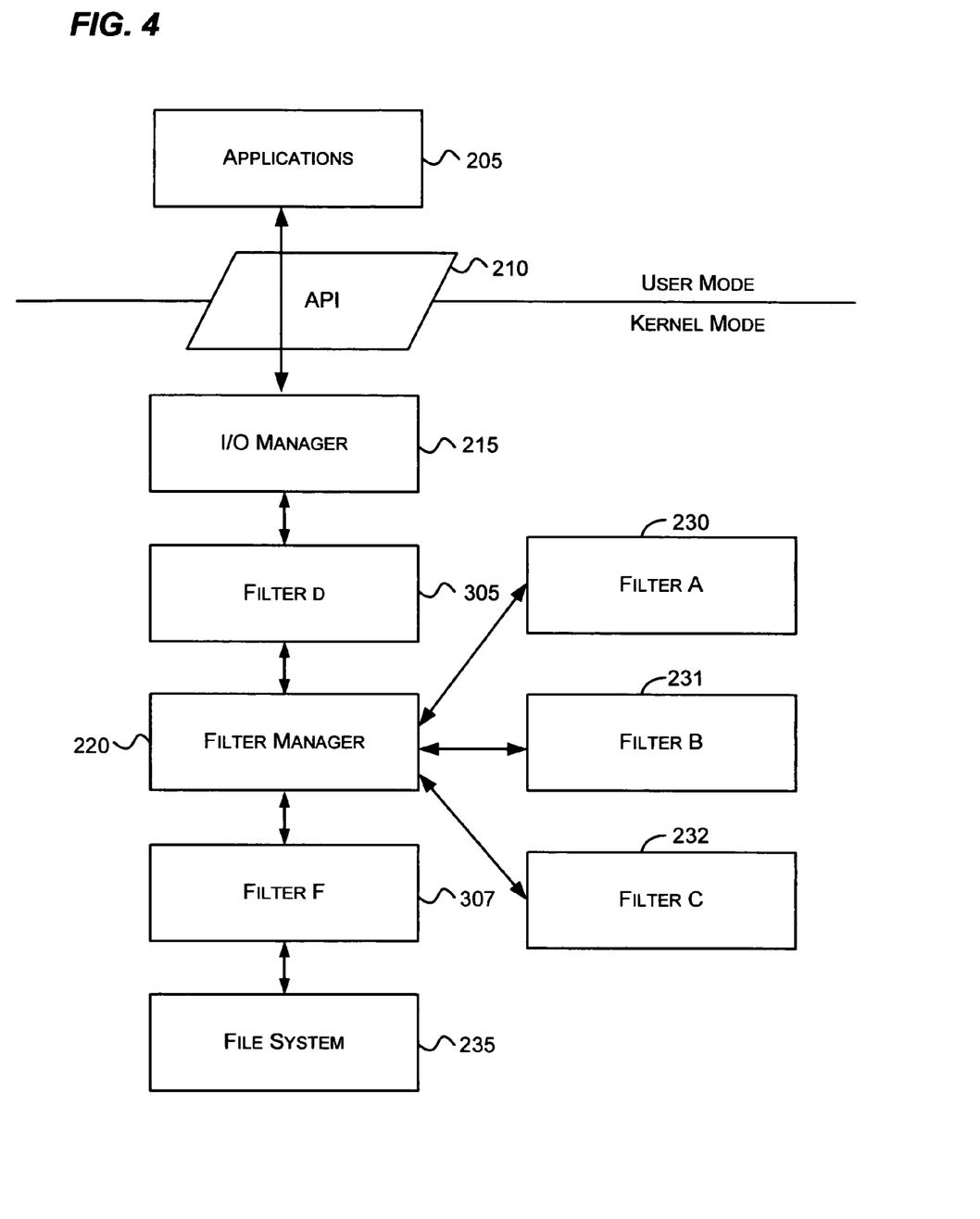
FIG. 4 is a block diagram representing another exemplary arrangement of components of a system in which the present invention may operate in accordance with various aspects of the invention.

In another embodiment of the invention, filters may be arranged in a stacked/managed manner as illustrated in FIG. 4, which is a block diagram representing another exemplary arrangement of components of a system in which the present invention may operate in accordance with various aspects of the invention. In this configuration, some filters are associated with a filter manager while other filters are not. The filter manager 220 is placed in a stack with other filters (e.g., filters 305 and 307).

It will be readily recognized that filters may be implemented in many other configurations without departing from the spirit or scope of the invention. In some embodiments, a filter comprises any object that examines I/O between an application and a file system and that is capable of changing, completing, or aborting the I/O or performing other actions based thereon. Such filters may execute in user mode or in kernel mode and may be part of other components.

Returning to FIG. 2, the file system 235 may include one or more volumes that may be located locally or remotely to the machine or machines upon which the applications 205 execute.

Maintaining Namespace Consistency

Figure 5:
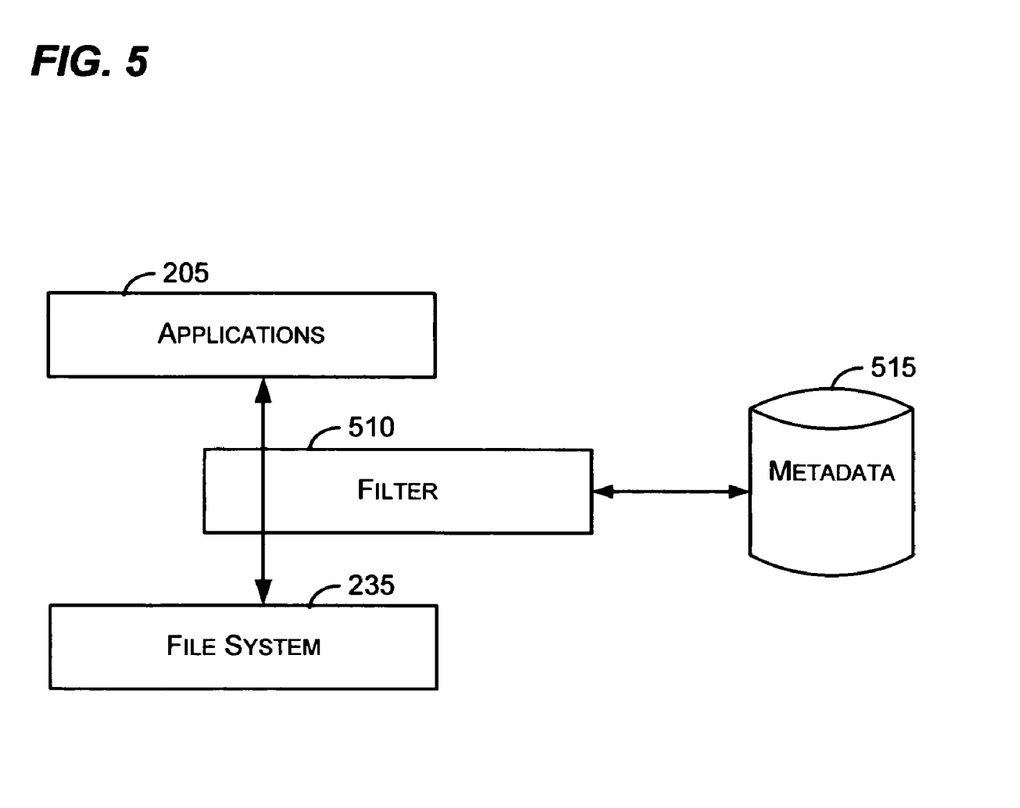
FIG. 5 is a block diagram representing an exemplary arrangement of components of a system in which the present invention may be practiced in accordance with various aspects of the invention.

FIG. 5 is a block diagram representing an exemplary arrangement of components of a system in which the present invention may be practiced in accordance with various aspects of the invention. The system includes one or more applications 205, a filter 510, a metadata database 515, and a file system 235.

When the filter 510 is attached to a volume of the file system (e.g., monitoring I/O to and from the volume), the filter 510 may make changes to the metadata 515 to keep the namespace of objects (e.g., files, directories, and the like) identified by the metadata in sync with a corresponding namespace of the volume for those objects. An exemplary method and system for accomplishing this is described in a United States Patent Application entitled "METHOD AND SYSTEM FOR MAINTAINING NAMESPACE CONSISTENCY WITH A FILE SYSTEM," filed concurrently herewith, Ser. No. 11/000,430, which application is assigned to the assignee of the present invention and hereby incorporated by reference.

When the filter is unattached from the volume (e.g., not monitoring I/O to and from the volume), changes may occur to the namespace of the volume that the filter may not concurrently update in the metadata 515. Some of the namespace changes of the volume may not be of interest to the filter because they involve objects that are not identified by the metadata. Some of the namespace changes, however, may be of interest to the filter because they involve objects identified by the metadata or involve objects related to such objects (e.g., ancestors of such objects). For example, a filter may enforce a quota on a directory. If the directory or any of its ancestors is moved to another location on the volume, the filter may need to know where the directory has moved so that the filter may continue to enforce the quota.

For each object of interest to the filter, the namespace stored in the metadata may include an identifier that identifies the object to a file system and a name that includes a path to the object. This information may need to be updated to synchronize it with the corresponding namespace of the volume if changes occur while a filter is unattached from the volume.

The metadata may also include other information regarding each object of interest to the filter without departing from the spirit or scope of the present invention. For example, the metadata may include a policy or other information for one or more of the objects. This other information, however, typically will not need to be updated as the namespace of the volume changes unless this other information is derived from or dependent upon the information above.

A filter may be unattached or become unable to monitor changes to a volume if the filter is unloaded (e.g., for maintenance reasons such as patching the filter or otherwise) or terminated, if another operating system is changing the volume without passing requests through the filter (e.g., on a dual boot system), if the volume is taken to another computer that does not execute the filter and modifications to the volume occur, and in other situations in which the volume is changed when the filter is not monitoring the I/O.

The namespace of the metadata may also become out-of-sync with the corresponding namespace of a volume if the volume is formatted and restored (e.g., from a backup dataset) as discussed in more detail below.

When the filter is attached to a volume, the namespace of the metadata may need to be updated to reflect the changes that occurred to the corresponding namespace of the volume while the filter was unattached from the volume. This is sometimes referred to as synchronizing the namespace of the filter with the namespace of the volume and may involve synchronizing the namespace of the filter with only a portion of the namespace of the volume as not all objects on the volume may be of interest to the filter.

Changes that occur to the corresponding namespace of the volume may include renaming or deleting an object of the volume. In some operating systems, renaming an object may change the name of an object and/or move the object. In other operating systems, changing the name of an object and moving the object are separate operations. Either form of renaming may be used without departing from the spirit or scope of the present invention.

In one embodiment, the metadata database 515 comprises a file that is persisted in non-volatile storage. When the filter 510 begins executing, it may read the metadata database 515 to create data structures to assist the filter 510 in performing its functions.

Figure 6:
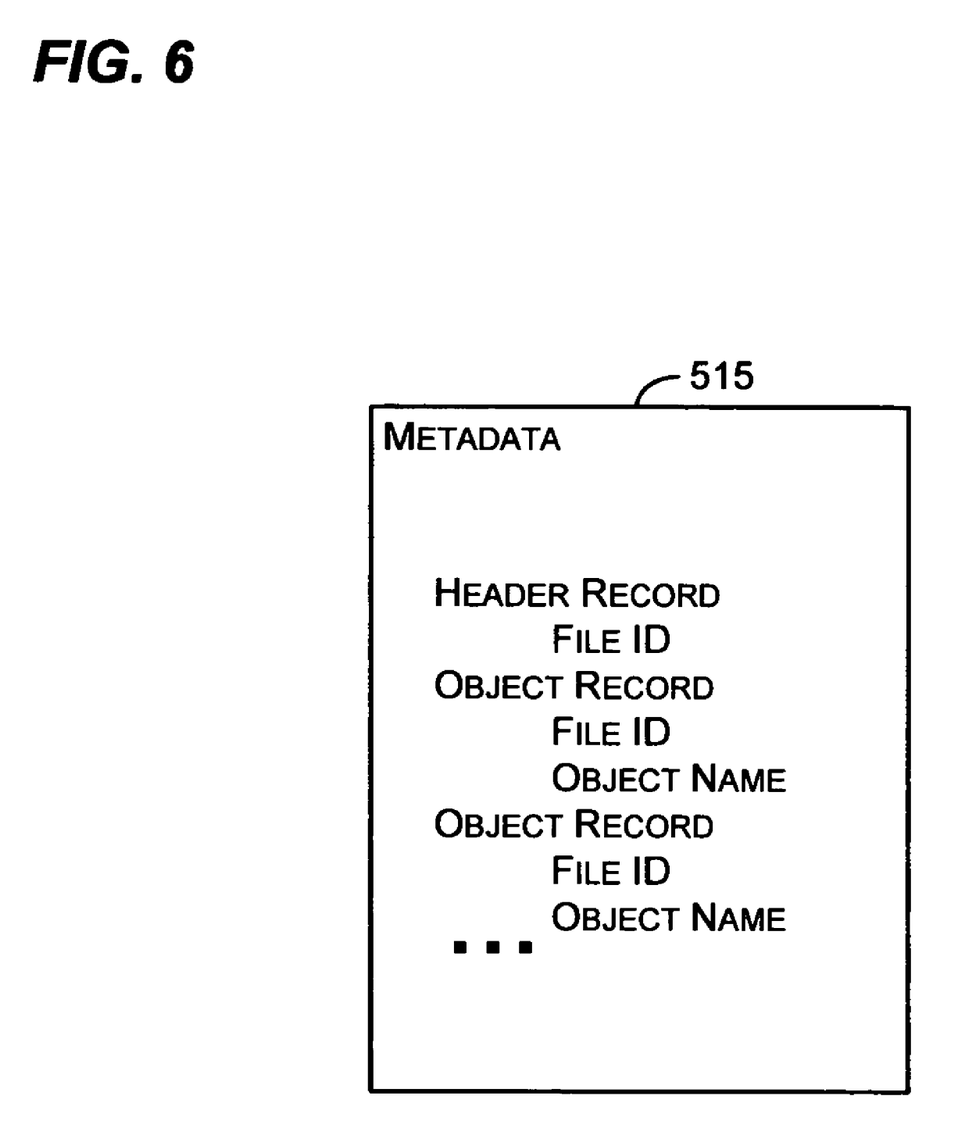
FIG. 6 is a block diagram that generally represents an exemplary metadata database in accordance with various aspects of the invention.

FIG. 6 is a block diagram that generally represents an exemplary metadata database in accordance with various aspects of the invention. In this embodiment, the metadata database 515 comprises a file that includes a header record and object records. In other embodiments, the metadata database 515 may include a header record and zero or more object records.

The header record includes a file ID that stores the file ID of the metadata file. This file ID is useful in determining whether a format and restore has taken place on the volume associated with the metadata while the filter was unattached to the volume. In some operating systems, each object stored on a file system is assigned a unique file ID. This file ID serves to identify the object and may be used in file operations to, for example, open, change, or delete the object.

When a volume is restored (e.g., from a backup dataset), file IDs associated with existing objects may be deleted (e.g., through formatting or overwriting the volume) and may be recreated for each object restored to the volume. File IDs may be created by a unique ID generator or the like, and the recreated file IDs may not match the original file IDs that existed before the volume was restored. Thus, when the metadata file is restored, the metadata file may not have the same file ID it had before the restore.

By checking the file ID of the header record against the file ID of the metadata file, a filter may determine whether a restore has occurred. This is important because if a restore has occurred, the file IDs of other object records may not match file IDs in the volume and may need to be updated to match the file IDs of the newly-restored objects.

It will be recognized that other mechanisms may be used to determine whether a volume has been restored. These other mechanisms may be used without departing from the spirit or scope of the invention.

If the volume has not been restored, the filter may attempt to open each object included in the metadata with the object record's file ID. If the attempt is successful, the filter may then determine if the object name has changed, and if so, the filter may then update the object name in the object record.

If the attempt to open the object via the file ID is unsuccessful, this may mean the object has been deleted or that the file ID has changed. In this case and in the case of a restore, the filter may attempt to open the object via the object name. If the filter is able to open the object via the object name, the filter may then determine the file ID and update the object record with the new file ID. If the filter is unable to open the object via the object name, the filter may then delete the object record from the metadata file.

After the filter has performed the actions described above, the namespace of the filter is in sync with the corresponding namespace of the volume. To keep the namespaces in sync while the filter is attached to the volume, the filter may then monitor for namespace changes of interest and update the metadata as the changes occur.

Figure 7:
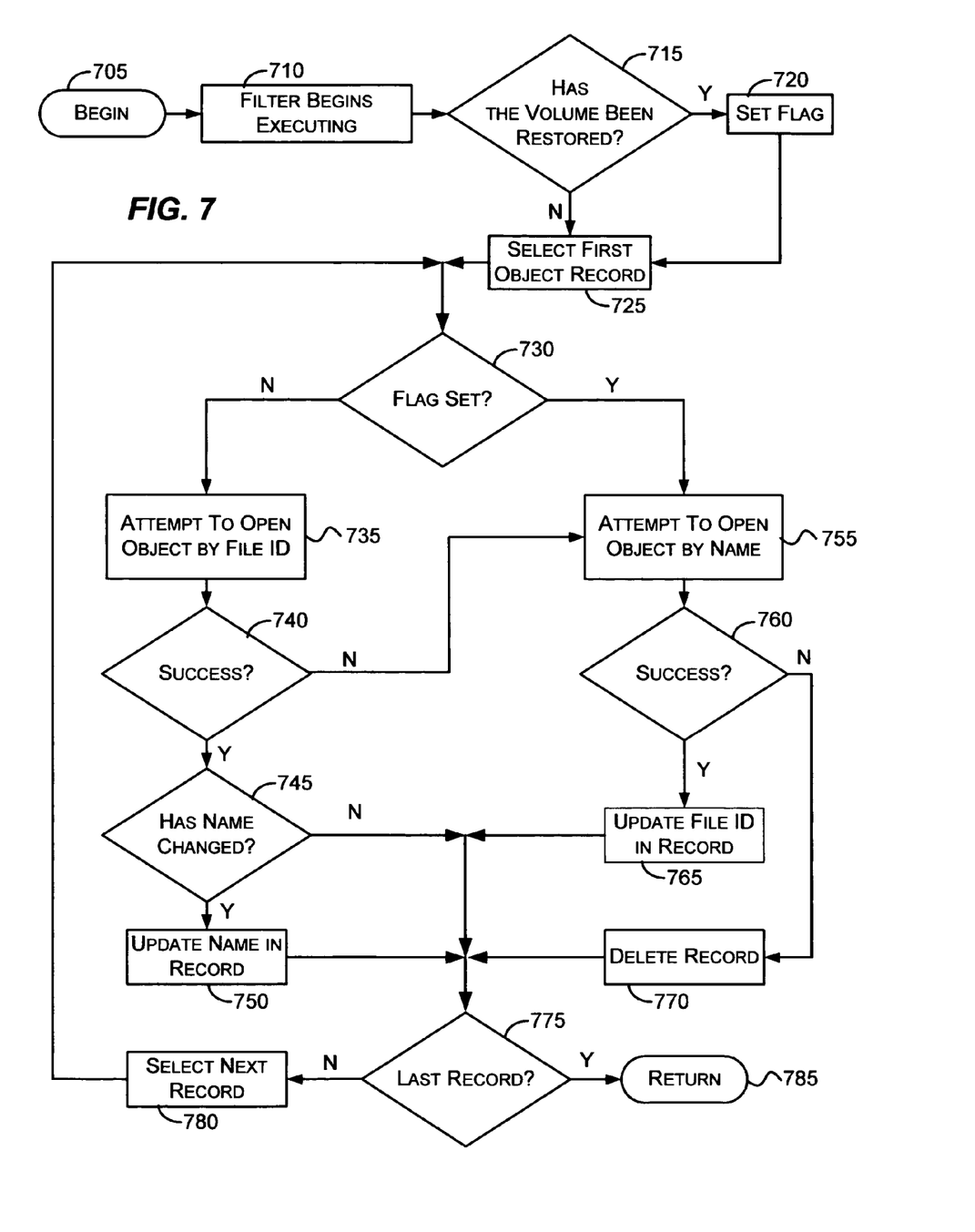
FIG. 7 is a flow diagram that generally represents actions that may occur in synchronizing a filter namespace with a volume namespace upon attaching a filter to a volume.

FIG. 7 is a flow diagram that generally represents actions that may occur in synchronizing a filter namespace with a volume namespace upon attaching a filter to a volume. The process begins at block 705.

At block 710, a filter is attached to a volume and begins executing. The filter begins by synchronizing its namespace with the corresponding namespace of the volume. At block 715, a determination is made as to whether the volume has been restored. If so, processing branches to block 720; otherwise, processing branches to block 725. As mentioned previously, it may be determined that the volume has been restored if the file ID included in the header record of the metadata file does not match the file system file ID currently associated with the metadata file. Furthermore, restoring a volume (e.g., from a backup dataset) may also involve formatting the volume in preparation for the restore.

At block 720, a flag is set that indicates that a restore has occurred. At block 725, the first object record is selected. At block 730, if the flag is set, processing branches to block 755; otherwise processing branches to block 735. When the flag is set, no attempt is made to open each object by file ID; rather, an attempt is made to open each object by name.

At block 735, an attempt is made to open the object by file ID. At block 740, if the attempt is successful, processing branches to block 745; otherwise, processing branches to block 755. At block 745, a determination is made as to whether the name of the object is different from the name stored in the metadata. If so, processing branches to block 750; otherwise, processing branches to block 775. At block 750, the name of the object in the metadata is updated to match the name of the object on the volume.

At block 755, an attempt is made to open the object by name. At block 760, if the attempt is successful, processing branches to block 765; otherwise, processing branches to block 770. At block 765, the file ID of the object is updated in the metadata to match the file ID of the object on the volume.

At block 770, the record is deleted to remove it from the metadata. This occurs because the filter is unable to open the object. If the volume was not restored, the filter unsuccessfully attempted to open the object by file ID and then by name. If the volume was restored, the filter unsuccessfully attempted to open the object by name.

At block 775, a determination is made as to whether this is the last record of the metadata. If so, processing branches to block 785; otherwise, processing branches to block 780. At block 780, the next record is selected. The actions associated with blocks 730-780 may be repeated until all records in the metadata have been synchronized with their corresponding objects on the volume.

At block 785, the process returns. Before or after the process returns, the file ID of the metadata file may be stored in the metadata file to detect subsequent restores. The actions described above may be repeated each time a filter is reattached to a volume.

As can be seen from the foregoing detailed description, there is provided a method and system maintaining consistency between the namespaces of selected objects maintained by a file system and a filter associated therewith. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions encoded thereon which, when executed within a computing environment, implement a method comprising:
   persisting metadata maintained by a filter in a computer-readable storage medium, wherein the metadata comprises one or more object records including information associated with an object of a file system;
   attaching the filter to a volume of the file system;
   determining whether the volume has been restored;
   selecting an object record from the metadata;
   when the volume has been restored, attempting to open the object associated with the object record by name;
   when the volume has not been restored, attempting to open the object associated with the object record by file ID;
   updating the metadata by:
   i—when opening the object by file ID is successful, determining if the object's name has changed;
   ii—when the name has changed, updating the object's name in the metadata to match the object's name on the volume;
   iii—when opening the object by file ID is unsuccessful, attempting to open the object using the object's name;
   iv—when opening the object using the object's name is successful, updating the file ID of the object in the metadata to match the file ID of the object on the volume; and
   v—when opening the object using the object's name is unsuccessful, deleting the object record from metadata; and
   after updating the metadata, then:
   a—determining whether another object record exists in the metadata which has not been selected; and
   b—when another object record exists in the metadata which has not been selected, selecting the another object record.

2. The computer-readable medium of claim 1, wherein the metadata comprises a file and wherein persisting the metadata maintained by a filter comprises storing the file on the file system.

3. The computer-readable medium of claim 1, wherein the filter maintains the metadata while changes to the file system occur when the filter is attached to the file system.

4. The computer-readable medium of claim 3, wherein attaching the filter to the file system comprises causing the filter to monitor I/O to and from the file system.

5. The computer-readable medium of claim 1, wherein the change comprises renaming the object.

6. The computer-readable medium of claim 5, wherein renaming the object comprises moving the object within the file system.

7. The computer-readable medium of claim 5, wherein renaming the object comprises changing a name of the object without moving the object.

8. The computer-readable medium of claim 5, wherein updating the metadata comprises changing a name of the object included in the information.

9. The computer-readable medium of claim 1, wherein the change comprises deleting the object.

10. The computer-readable medium of claim 9, wherein updating the metadata comprises deleting the information.

11. The computer-readable medium of claim 1, wherein the change comprises restoring the object from a backup dataset.

12. The computer-readable medium of claim 11, wherein the metadata comprises a file, wherein the metadata includes an identifier associated with the file, and wherein the identifier is obtained from the file system.

13. The computer-readable medium of claim 12, further comprising comparing the identifier included in the metadata with an identifier of the file maintained by the file system to determine that the change comprises restoring the object from a backup dataset.

14. The computer-readable medium of claim 11, wherein updating the metadata comprises changing a file identifier included in the information.

15. The computer-readable medium of claim 1, wherein the information comprises a name of the object and an identifier that identifies the object.

16. The computer-readable medium of claim 15, wherein updating the metadata comprises updating the identifier to match an identifier with which the file system identifies the object.

17. The computer-readable medium of claim 15, wherein updating the metadata comprises updating the identifier to match a name with which the file system identifies the object.

18. The computer-readable medium of claim 17, wherein the name comprises a path to the object.

19. In a computing environment, a method, comprising:
persisting metadata associated with a filter in a computer-readable storage medium, wherein the metadata includes a first namespace associated with a first set of objects of a volume, and wherein the volume includes a second namespace of a second set of objects of the volume;
attaching the filter to the volume;
determining whether the volume has been restored;
when the volume has not been restored, attempting to open each object included in the first namespace with the object's file ID;
when the volume has been restored, attempting to open each object included in the first namespace with the object's name;
for each object included in the first namespace, determining that the second namespace was changed and synchronizing the first namespace with the second namespace by:
i—when opening the object by file ID is successful, determining if the object's name has changed;
ii—when the name has changed, updating the object's name in the metadata to match the object's name on the volume;
iii—when opening the object by file ID is unsuccessful, attempting to open the object using the object's name;
iv—when opening the object using the object's name is successful, updating the file ID of the object in the metadata to match the file ID of the object on the volume;
v—when opening the object using the object's name is unsuccessful, deleting the object record from metadata.

20. The method of claim 19, wherein the first namespace comprises a set of records associated with objects of the volume.

21. The method of claim 20, wherein the set of records comprises a record that includes a file system identifier for a file in which the metadata is persisted.

22. The method of claim 21, wherein changing the second namespace comprises restoring a dataset to the volume.

23. The method of claim 22, wherein restoring a dataset to the volume comprises creating a new file system identifier that identifies the file.

24. The method of claim 23, further comprising determining that the second namespace has changed by comparing the new file system identifier to the file system identifier included in the record.

25. The method of claim 20, wherein the set of records comprises a record that includes a name of an object of the first set of objects and a file system identifier of the object.

26. The method of claim 25, wherein changing the second namespace comprises changing the name of the object on the volume.

27. The method of claim 25, wherein changing the second namespace comprises changing the file system identifier of the object on the volume.

28. The method of claim 19, wherein the filter is unattached from the volume when the filter is not monitoring I/O to and from the volume.

29. The method of claim 19, wherein attaching the filter to the volume comprises causing the filter to monitor I/O to and from the volume.

30. The method of claim 19, wherein the first set of objects is a subset of the second set of objects.

31. The method of claim 19, wherein synchronizing the first namespace with the second namespace comprises for each object of the first set of objects of the volume, determining whether the object has been at least one of renamed or deleted.

32. The method of claim 31, further comprising if the object has been renamed, changing the first namespace to reflect renaming information associated with the object.

33. The method of claim 31, further comprising if the object has been deleted, changing the first namespace to delete a record associated with the object.

* * * * *